(12) United States Patent
Jacob et al.

(10) Patent No.: US 8,894,054 B2
(45) Date of Patent: Nov. 25, 2014

(54) DEVICE AND METHOD FOR STIFFENING AND HOLDING A WORKPIECE FOR MACHINING

(75) Inventors: Thomas Jacob, Borken (DE); Hans-Jürgen Pierick, Reken (DE); Richard Löttert, Velen (DE)

(73) Assignee: Fooke GmbH, Borken (DE)

( * ) Notice: Subject to any disclaimer, the term of this patent is extended or adjusted under 35 U.S.C. 154(b) by 132 days.

(21) Appl. No.: 13/452,345

(22) Filed: Apr. 20, 2012

(65) Prior Publication Data

US 2012/0291252 A1    Nov. 22, 2012

Related U.S. Application Data

(63) Continuation of application No. PCT/DE2010/001236, filed on Oct. 21, 2010.

(51) Int. Cl.
| | |
|---|---|
| *B25B 11/00* | (2006.01) |
| *B23Q 3/00* | (2006.01) |
| *B23Q 3/08* | (2006.01) |
| *B65G 47/91* | (2006.01) |

(52) U.S. Cl.
CPC .............. *B25B 11/005* (2013.01); *B65G 47/91* (2013.01); *B23Q 3/088* (2013.01)
USPC ......................................... 269/21; 269/289 R

(58) Field of Classification Search
USPC .................................. 269/20, 21, 296, 289 R
See application file for complete search history.

(56) References Cited

U.S. PATENT DOCUMENTS

| | | | | |
|---|---|---|---|---|
| 2,729,040 | A * | 1/1956 | Wallace et al. | 451/388 |
| 3,172,358 | A * | 3/1965 | Weiss | 101/126 |
| 3,652,075 | A * | 3/1972 | Thompson | 269/21 |
| 3,720,433 | A * | 3/1973 | Rosfelder | 294/188 |
| 4,066,039 | A * | 1/1978 | Fletcher et al. | 118/500 |
| 4,597,569 | A * | 7/1986 | Itamoto et al. | 269/21 |
| 5,572,786 | A * | 11/1996 | Rensch | 29/559 |
| 5,584,746 | A * | 12/1996 | Tanaka et al. | 451/41 |
| 5,671,910 | A * | 9/1997 | Davies et al. | 269/21 |
| 6,241,825 | B1 * | 6/2001 | Wytman | 118/733 |
| 6,325,059 | B1 * | 12/2001 | Tieber | 125/35 |
| 6,638,391 | B1 * | 10/2003 | Hsu et al. | 156/345.12 |
| 7,055,229 | B2 * | 6/2006 | Wilk et al. | 29/281.1 |
| 7,380,776 | B2 * | 6/2008 | Boyl-Davis et al. | 269/21 |
| 7,731,166 | B2 * | 6/2010 | Kaiser et al. | 269/21 |
| 7,757,363 | B2 * | 7/2010 | Wilk et al. | 29/281.1 |

(Continued)

FOREIGN PATENT DOCUMENTS

DE        2018605 A1    12/1970

*Primary Examiner* — Lee D Wilson
*Assistant Examiner* — Jamal Daniel
(74) *Attorney, Agent, or Firm* — Patricia M. Mathers

(57) ABSTRACT

The invention is a clamping plate used to stiffen and hold a large, thin workpiece having low inherent stiffness. The clamping plate has a back layer, an intermediate layer and a contact layer. A plurality of grooves, which serve as air channels, is provided in the contact layer and the intermediate layer impart flexibility to the clamping plate. The clamping plate has sufficient flexibility to adapt to the specified contour of the workpiece. The contact layer is placed against the workpiece and vacuum apparatus provides suction through the air channels, which are in flow communication with each other between the two layers, to hold the workpiece against the clamping plate. One or more seals defines a holding area on the contact layer and prevent loss of suction.

11 Claims, 2 Drawing Sheets

(56) References Cited

U.S. PATENT DOCUMENTS

| | | | |
|---|---|---|---|
| 7,780,005 B2* | 8/2010 | Allison et al. | 206/460 |
| 8,322,696 B2* | 12/2012 | McClaran | 269/21 |
| 8,505,890 B2* | 8/2013 | Toya | 269/21 |
| 8,646,764 B2* | 2/2014 | Barlier et al. | 269/21 |
| 8,662,485 B2* | 3/2014 | Asada | 269/21 |
| 8,690,135 B2* | 4/2014 | Vekstein et al. | 269/21 |
| 2003/0074788 A1* | 4/2003 | Gordon | 29/832 |
| 2012/0291252 A1* | 11/2012 | Jacob et al. | 29/407.07 |
| 2013/0087276 A1* | 4/2013 | Matthews | 156/272.4 |
| 2013/0200559 A1* | 8/2013 | Asada | 269/21 |
| 2013/0270756 A1* | 10/2013 | Wimplinger et al. | 269/21 |
| 2014/0042682 A1* | 2/2014 | Bao et al. | 269/21 |

\* cited by examiner

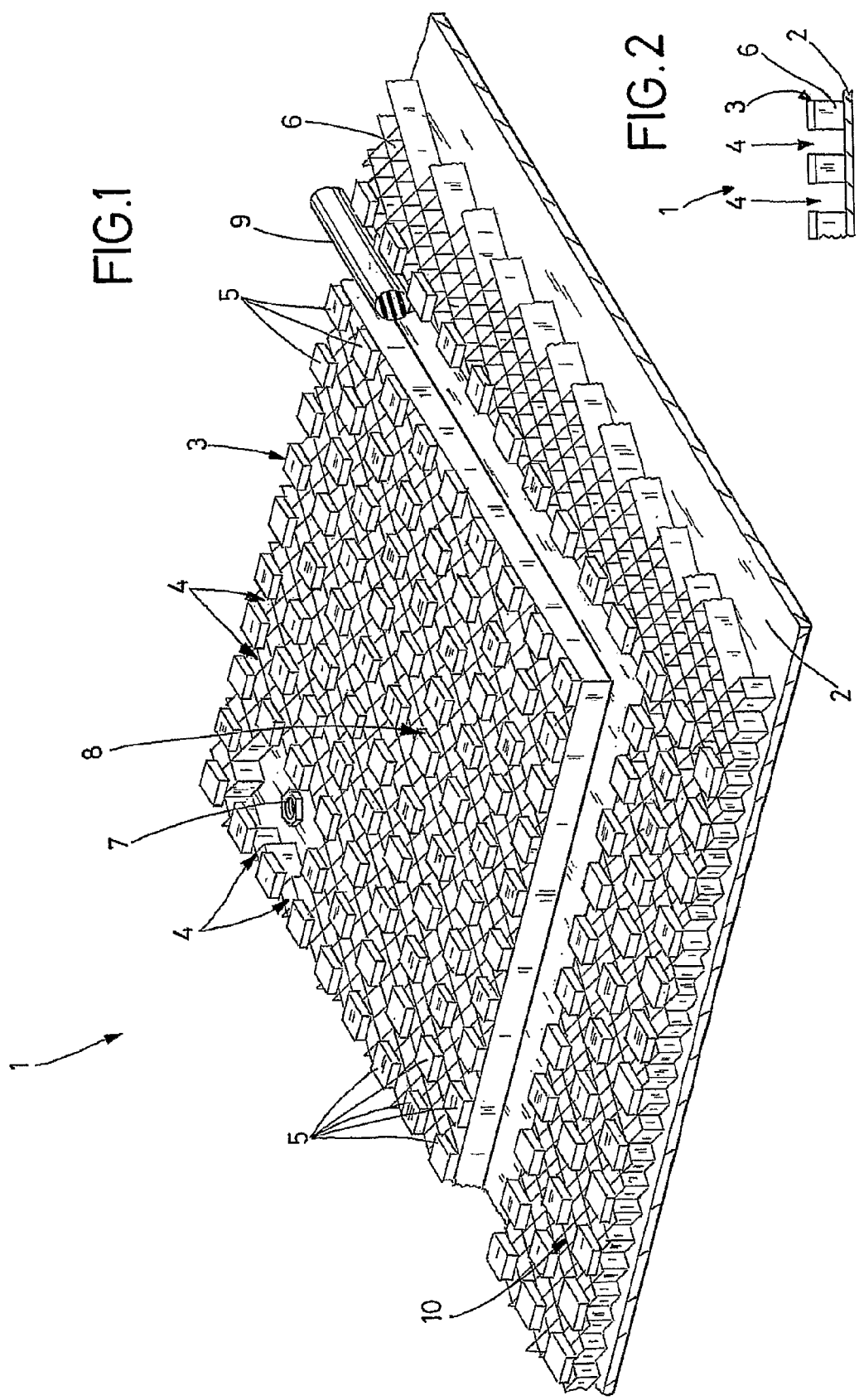

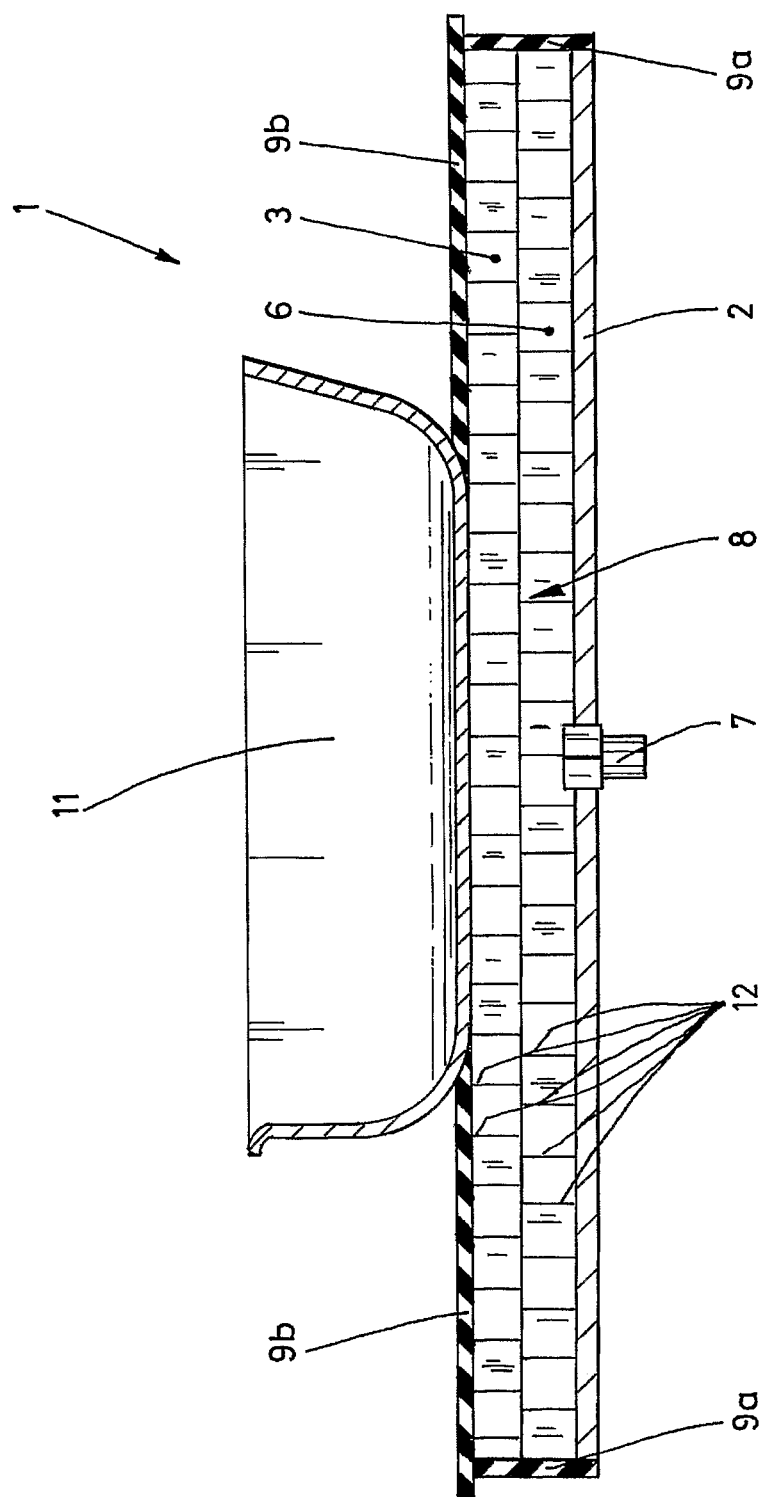

DEVICE AND METHOD FOR STIFFENING AND HOLDING A WORKPIECE FOR MACHINING

BACKGROUND INFORMATION

1. Field of the Invention

The invention relates to a device for stiffening a large, thin workpiece having low inherent stiffness. More particularly, the invention relates to a fixture for holding such a workpiece during a machining operation.

2. Discussion of the Prior Art

When machining large, thin aluminum sheets, for example, it is desirous to reduce the weight of the workpiece and this is commonly done by machining, i.e., milling, away material, so as to reduce the layer thickness in certain areas. This is commonly done in the field of aircraft construction. It is, of course, important to maintain high machining accuracy and avoid undesirable degradation of the components resulting from removing too much material. To this end, it is necessary to guide the machining tool, e.g., a cutter head, as precisely as possible, whereby the precise position of the workpiece also has to be maintained. Any flexibility in the workpiece can cause it to yield under the machining pressure of the tool, with the result that the workpiece is not machined according to specification. To avoid such yielding by the workpiece, clamping means are used that clamp and stiffen such workpieces.

It is known in the field to use so-called clamping tables that are equipped with a large number of actuators arranged in a matrix. The actuators generally have suction devices on their free end, which serve to hold and fix the workpiece in position. The actuators are individually adjustable, that is, the height and angle of the suction device of each actuator is adjustable independently of other actuators, so that an entire array of actuators can be adapted to correspond to the specified contour of the workpiece. Each individual actuator can cost more then 1,000.00 Euros and, because the actuators should be placed as close together as possible to ensure optimum support of the workpiece, such clamping tables are relatively expensive. In practice, however, it is common to see thin-walled workpieces buckling in the spaces between the actuators, that is, yielding under the machining tool. These areas are then insufficiently machined. Machining to specification the requires that the workpiece be re-worked, and this re-work machining requires a great deal of effort regarding fixtures and devices and measurement techniques.

BRIEF SUMMARY OF THE INVENTION

The aim of the invention is to create a fixture or device for stiffening a large, thin workpiece that has low inherent stiffness, i.e., to provide a fixture that provides excellent support of the workpiece and that can be produced economically.

The invention is a flexible clamping plate that uses suction to hold the workpiece against the plate. The plate is a composite construction with at least three layers: a back layer, an intermediate layer, and a contact layer. The contact layer is the side of the clamping plate that is brought into contact with the workpiece to be machined. Air channels that penetrate through the contact layer and into the intermediate layer create layers that are deformable, thereby imparting a flexibility to the plate, such that the plate is easily adaptable to the relatively large radii of large workpieces.

The aforementioned air channels may be constructed as intersecting grooves, which results in a two-directional flexibility of the clamping plate. This makes it possible to place the clamping plate on workpieces that are spherically curved.

Alternatively, the air channels may be constructed by arranging two so-called honeycomb panels one above the other. For example, two honeycomb panels of the same type may be arranged one above the other, with the alignment of the cell walls offset by 90°. The manufacturing tolerances and the 90° offset ensure that the cell walls of the honeycombs are not arranged precisely one above the other, so that there is in an air-permeable connection between these two honeycomb panels. As a result, air flows meanderingly through the cells of the two honeycomb panels lying one above the other.

The clamping plate has a back layer on the opposite, rearward side, that is, on the side facing away from the workpiece. The contact layer is divided by the air channels into a large number of individual segments, but the back layer may be a continuous layer, so that, on the one hand, it contributes significantly to the stability of the clamping plate and, in particular, provides a closed surface that makes it possible, for example, to clamp the clamping plate onto the aforementioned actuator field of a clamping table. The closed construction of the back layer hereby facilitates affixing the clamping plate to the suction devices of the actuators by means of negative pressure.

The clamping plate according to the invention provides an almost complete, continuous support of the workpiece in the area to be machined, even if the individual actuators are arranged relatively far apart from one another and, because of this, holds the workpiece much more accurately and precisely on conventional clamping tables, without difficulty and relatively economically. The actuators reliably hold the back layer of the clamping plate with their suction devices, so that only the thickness of the clamping plate has to be taken into consideration when calculating the machining depth on the workpiece. Other than that, the workpiece may be machined on a clamping table equipped with actuators that are almost unchanged relative to conventional actuators. The clamping plates provides the advantage, however, that the workpiece is machined with significantly greater precision, because it is prevented from buckling in the areas between the actuators, that is, the clamping plate prevents or at least greatly reduces any yielding on the part of the workpiece under the contact pressure exerted by the tool.

The clamping plate according to the invention has holding means for holding the clamping plate against the workpiece. It is intended, that the workpiece be held to the clamping plate by means of negative pressure. The contact layer therefore has breakthroughs, openings, grooves, or the like, so that air is suctioned through the air channels and a negative pressure applied to the contact surface of the clamping plate and, in this way, holding the workpiece against the clamping plate. To this effect, a so-called holding area is created that is defined by the fact that it is surrounded by a seal. A suction connector is provided within this holding area, to provide the suction in this holding area when the clamping plate, and particularly its seal, lie against the workpiece. The suction of the holding area not only holds the clamping plate against the workpiece, but also serves to improve the stiffness of the composite layers, which comprise the initially flexible clamping plate and the workpiece.

The seal may be constructed exclusively as a seal that extends circumferentially around and borders the holding area. The seal extends to the contact surface of the contact layer, so that it seals against the workpiece.

If, for example, the workpiece is larger than the clamping plate, a seal may be provided on the outside around the edge of the clamping plate. If the workpiece is smaller than the clamping plate, however, a seal may be fitted in a groove that is formed as a closed ring. This ring may have shape, i.e., does not have to be circular, and this provides the advantage that the seal may be better adapted to the shape of the workpiece.

It is desirable, however, not to always have to provide custom-made clamping plates with special seal contours for such small workpieces. To eliminate this need, the seal may advantageously be constructed in two parts: an edge seal and a surface seal. The edge seal extends around the perimeter of the holding area. Having the seal surround the outer edge of the clamping plate is advantageous, in that the maximum surface of the clamping plate is usable as the holding area. The surface of the contact layer that is not covered by the workpiece is then covered by a surface seal, to prevent suction loss in this area. The surface seal may, for example, be constructed as a rubber mat or a cloth with a rubber-like coating. Different workpieces thus require only different surface seals.

An intermediate layer that is as lightweight as possible is provided between the contact layer and the back layer. The grooves provided in the contact layer also extend into this layer, in order to improve the flexibility of the clamping plate. This intermediate layer may advantageously have a large number of hollow spaces, in order to obtain the most lightweight structure of the entire clamping plate.

If the air channels are formed by intersecting grooves, the hollow spaces may advantageously be constructed as closed-cells. If hollow spaces are cut into when cutting intersecting grooves into the clamping plate, the closed-cell construction of these hollow spaces prevents an almost unlimited leakage from occurring. Moreover, the closed-cell construction of the hollow spaces does not affect the evacuability of the holding area of the clamping plate.

Constructing the intermediate layer as a honeycomb panel provides an advantageous combination of "low weight" and "stiffness." Depending upon the material that is used for the honeycomb, slits or grooves, for example, may be provided in the honeycomb panel in a diamond pattern to improve the flexibility of the honeycomb panel. This may be done, for example, in metal honeycombs. Other materials, such as, paper or paper-like materials, may inherently exhibit sufficient flexibility to allow the clamping plate to adapt to the contour of the workpiece. The fact that workpieces with relatively large bending radii and correspondingly slight curvatures are frequently machined, as was explained using the example of the aircraft industry and its existing workpieces, is part of the consideration.

The honeycombs of the suitable honeycomb panels according to the invention may have very different cell shapes or honeycomb forms, such as, for example, rectangular, hexagonal, or Omega-shaped walls.

If the contact layer is also made of a honeycomb panel, as mentioned above, the contact surface of the honeycomb cells of the contact layer may advantageously be coated with a sealing material. For example, the honeycomb panel may be dipped into an appropriate liquid sealant, so that the cell walls of the honeycombs are coated with the sealing material up to a thickness of about 1 to 2 mm. After the sealant has dried or hardened, the honeycomb panel, serving as the contact layer of the clamping plate, may be placed on the workpiece. The coated edges of these cell walls effectively serve as seals, thereby avoiding suction loss, and ensure that when negative pressure is applied, the workpiece is reliably held against this honeycomb panel.

Advantageously, the clamping plate may have a ferromagnetic layer. This may, if necessary, serve to temporarily hold the clamping plate against the workpiece that is to be machined, before the actual holding means is actuated to securely fasten the clamping plate to the workpiece. In practice, however, in a vast majority of machining jobs, the ferromagnetic layer is not useful as a temporary holding means, because the workpieces to be machined are themselves not ferromagnetic, but are, instead, made of materials such as carbon-fiber-reinforced plastic (CFRP) and aluminum. The ferromagnetic layer may nevertheless be particularly useful as a reflection layer that is used to determine the thickness of the workpiece at the particular area to be machined.

In practice, the thickness of the material is not ideally constant and this creates a problem. For example, the very process of pulling a metallic workpiece over a form to create a desired contour can cause the material of the workpiece to begin to flow, resulting, ultimately, in areas that are thicker or thinner than the initial thickness. When certain areas of the workpiece are then to be machined and the final thickness of the material of the machined workpiece is specified, then the machining depth has to differ across the workpiece, area by area, namely, as a function of the original material thickness that the workpiece has at the respective area to be machined. The layer thickness of the workpiece at the area to be to be machined may be determined in a non-destructive manner by using, for example, ultrasonic measurement. The ferromagnetic layer of the clamping plate serves as a reflection surface for this purpose, so that clear and conclusive measured values may be obtained with ultrasonic measurement.

Basically, the ferromagnetic layer may be provided anywhere in the clamping plate, because the corresponding distance from the contact layer, that is, from the outside of the workpiece to be machined, is calculable. It is particularly advantageous that the contact layer, which forms the contact surface abutting the workpiece, is ferromagnetic, so that the contact surface also simultaneously constitutes the reflection surface for the ultrasonic waves and represents the actual boundary of the workpiece. This enables the most direct measurement possible and, in this way, reliably excludes inaccuracies that could possibly be caused by the distance of the reflection surface from the workpiece.

The most flexible clamping plate construction possible may advantageously be achieved by keeping the thickness of the layer of the clamping plate that is free of air channels as thin as possible. The air channels may extend not only through the contact layer, but also completely through the intermediate layer, that is, up to the back layer.

Depending upon the construction of the workpiece, different procedures may be used to machine the workpiece: On the one hand, the clamping plate may be initially shaped into a shape that corresponds to the specified contour of the workpiece. Thus, for example, the actuators of a clamping table may be adjusted in a known manner, so that, when the clamping plate is placed against the actuators, the contact surface takes on the desired outer contour of the workpiece. The thin, non-rigid workpiece is then placed onto the clamping plate and held against the clamping plate by the holding means provided on the clamping plate.

The actuators may be arranged advantageously in a conventional manner in a type of dot matrix distributed over the surface of the clamping table. The actuators are individually height-adjustable and can therefore be adapted to almost any contour in the form of surface gradients. In aircraft construction, for example, the outer surfaces of the fuselage and the wing unit are increasingly constructed as so-called free-form surfaces, which have a more complex surface geometry than standard surfaces, such as, for example, a flat plane or the surface of a sphere, a cone, or a cylinder. The actuators of the clamping table may be adapted without difficulty to these types of free-form surfaces by adjusting each of the individual actuators to the required height dimension. The actuators have fasteners on their free end, for example, negative-pressure suction devices, so that the deformable clamping plate according to the invention may be held against the actuators. The surface gradient of the clamping plate may be adapted to precisely conform to the desired specified contour of the workpiece by fine adjustment of the actuators. When the workpiece is then placed on and held against to the clamping plate, it takes on the specified contour.

Alternatively to this process, the workpiece may be supported in such a manner, that has its specified contour on the outer surface. The clamping plate is then placed on the workpiece, whereby the contour of the clamping plate adapts to the workpiece contour. Now, the workpiece is fastened to the clamping plate with the holding means provided on the clamping plate, so that the workpiece and the clamping plate may be moved, all the while maintaining the workpiece contour.

This flexibility may also be especially useful when the clamping plate is not intended to serve as a fixture for machining the workpiece at all, but rather when the use of this clamping plate is intended exclusively for transporting the workpiece: for example, when transporting large workpieces in the area of aircraft construction, transport fixtures specially adapted to the workpiece contour are usually used, for example, suction devices manufactured to correspond to the workpiece contour. By using the clamping plate according to the invention, a large number of different suction devices having shapes or contours custom-adapted to specific workpieces may be replaced by the clamping plate, so that a kind of universal transport fixture is created that is capable not only of equalizing workpiece tolerances of several identical workpieces, but may also be used to transport different workpieces with different specified contours. This considerably reduces the cost, as well as the storage space required to keep available a large number of differently constructed suction devices that are custom-adapted to the respective workpieces.

BRIEF DESCRIPTION OF THE DRAWINGS

Examples of proposed clamping plate embodiments are described in more detail below, using the purely schematic drawings.

FIG. 1 is perspective, partial cutaway view of an initial embodiment of a clamping plate according to the invention.

FIG. 2 is a cross-section of the clamping plate of FIG. 1.

FIG. 3 is a cross-section of a second embodiment of a clamping plate, with a workpiece positioned on the plate.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

FIG. 1 is a perspective, partial cut-away view of a clamping plate 1 according to the invention. The clamping plate 1 has three layers: a first outer layer 2 that is designated a back layer, a second outer layer 3 that is designated a contact layer, and an intermediate layer 6 sandwiched between the two outer layers. The contact layer 3 is the layer that is brought into contact with a workpiece that is to be machined. The back layer 2 is shown as a single-piece, continuous layer that forms the back surface of a sandwich plate. The intermediate layer 6 is constructed as a honeycomb structure in the two embodiment drawings.

In the embodiment shown in FIGS. 1 and 2, the contact layer 3 is divided into a large number of individual segments 5 that are formed by milling intersecting grooves 4 into the clamping plate 1. The free surface of these segments 5 forms the contact surface of the contact layer 3 that is brought into contact with the workpiece when the clamping plate 1 is placed on the workpiece.

For reasons of simplicity, the intermediate layer 6 shown in FIGS. 1 and 2 is shown as having a uniform thickness over the entire plate surface. In reality, however, as is clearly evident in FIG. 2, the grooves 4 extend not only through the contact layer 3, but also into the intermediate layer 6, so that the thickness of the honeycomb structure is reduced in the area of the grooves 4. In the embodiment shown in FIG. 2, the grooves 4 are milled through the entire intermediate layer 6, down to but not into the back layer 2. In other words, the intermediate layer 6 is completely milled away in the area of the grooves 4, thereby optimizing the flexibility and deformability of the clamping plate 1.

The contact layer 3 of the clamping plate 1, because of its inherent flexibility, is adaptable to the outer contour of the workpiece. Holding means of the clamping plate 1, which, in the embodiment shown, is a suction system, ensures a secure means of holding the workpiece against the clamping plate 1.

A suction connector 7 provided in the back layer 2 may, for example, be constructed as a socket that protrudes beyond the back plane of the clamping plate 1, such that a corresponding suction line may be connected to the suction connector 7. The suction connector 7 opens into an area of the clamping plate 1 that is called a holding area 8. As shown in FIG. 1, a seal 9 surrounds the holding area 8 and seals it against an open or free area 10 that lies beyond the seal 9 on the clamping plate 1. This free area 10 is an area that extends beyond an area that is intended to contact the workpiece and it is not held to the workpiece by the holding means. This free area 10 may nevertheless serve to support the workpiece during machining operation: For example, when the back layer 2 of the clamping plate 1 is affixed to the suction devices of a large number of actuators of a clamping table and the workpiece is lying on the clamping plate 1, the free area 10 still serves to prevent the workpiece from buckling and yielding under the force exerted by the tool, such as, for example, a mill head, in the area between two actuators.

FIG. 3 illustrates an embodiment of the clamping plate 1 according to the invention, with a workpiece 11 in position for machining. The contact layer 3 and the intermediate layer 6 are each constructed in the form of a honeycomb panel. It is apparent in the figure that the cell walls 12 of the two honeycomb panels are not exactly aligned with each other, thus resulting in air channels that allow air to flow from the suction connector 7 to the surface of the contact layer 3, that is, to the workpiece 11, and allow a negative pressure to be applied in the holding area 8, in order to hold the workpiece 11 against the clamping plate 1.

In the configuration of clamping plate 1 and workpiece 11 shown in FIG. 3, the workpiece 11 is smaller than the clamping plate and, thus, the surface of the contact layer 3 is not completely covered by the workpiece. In a situation such as this, the seal 9 on the clamping plate 1 is a two-part construction. An edge seal 9A surrounds the edge of the clamping plate 1 and prevents vacuum leakage at the edges of the honeycomb panels, that is, at the edges of the contact layer 3 and the intermediate layer 6. A surface seal 9B in the form of a rubber mat surrounds the workpiece 11 and abuts the contact surface of the contact layer 3, so that no leakage occurs on the surface of the clamping plate 1 and, thus, no loss in the negative pressure that is applied.

It is understood that the embodiments described herein are merely illustrative of the present invention. Variations in the construction of the device and method for holding a workpiece may be contemplated by one skilled in the art without limiting the intended scope of the invention herein disclosed and as defined by the following claims.

What is claimed is:

1. A device for stiffening a large, thin workpiece having low inherent stiffness, the device comprising:
    a clamping plate having at least three layers that include a first outer layer that is a back layer, a second outer layer that is a contact layer, and an intermediate layer sandwiched therebetween;
    a seal;
    at least one suction device that serves as a holding means to hold the workpiece against the contact layer; and
    a suction connector that is connected to a vacuum system;
    wherein a plurality of air channels extend through the contact layer and into the intermediate layer;
    wherein the back layer is bendable;
    wherein the seal delimits a holding area on the contact surface and provides a seal against the workpiece when the workpiece is placed against the contact layer; and
    wherein the suction connector provides a negative pressure in the air channels in the holding area, so as to hold the workpiece against the clamping plate by means of suction.

2. The device of claim 1, wherein the air channels are constructed as intersecting grooves cut into the clamping plate.

3. The device of claim 2, wherein the intersecting grooves extend through the contact layer and the intermediate layer.

4. The device of claim 1, wherein the contact layer and the intermediate layer are each constructed of a honeycomb panel having honeycomb cell walls and wherein one honeycomb panel is placed one on top of the other honeycomb panel, such that honeycomb cell walls of the one honeycomb panel are not aligned with the honeycomb cell walls of the other honeycomb panel, so as to provide open spaces in and between the contact layer and the intermediate layer that serve as the air channels.

5. The device of claim 4, wherein the contact layer has a contact surface for holding the workpiece and wherein the contact surface is coated with a sealant.

6. The device of claim 1, wherein the holding area of the clamping plate includes the seal includes an edge seal that seals the perimeter of the holding area and a surface seal that seals contact surface exposed on the holding area.

7. The device of claim 6, wherein the surface seal provides an airtight covering on the contact surface of the contact layer from the workpiece to the edge seal.

8. The device of claim 1, wherein the intermediate layer includes a plurality of hollow spaces.

9. The device of claim 1, wherein the hollow spaces are constructed as closed cells.

10. The device of claim 1, further including a ferromagnetic layer.

11. The device of claim 10, wherein the contact layer is ferromagnetic.

* * * * *